(No Model.)
F. J. WERNETH.
BICYCLE SUPPORT.
No. 559,646.  Patented May 5, 1896.
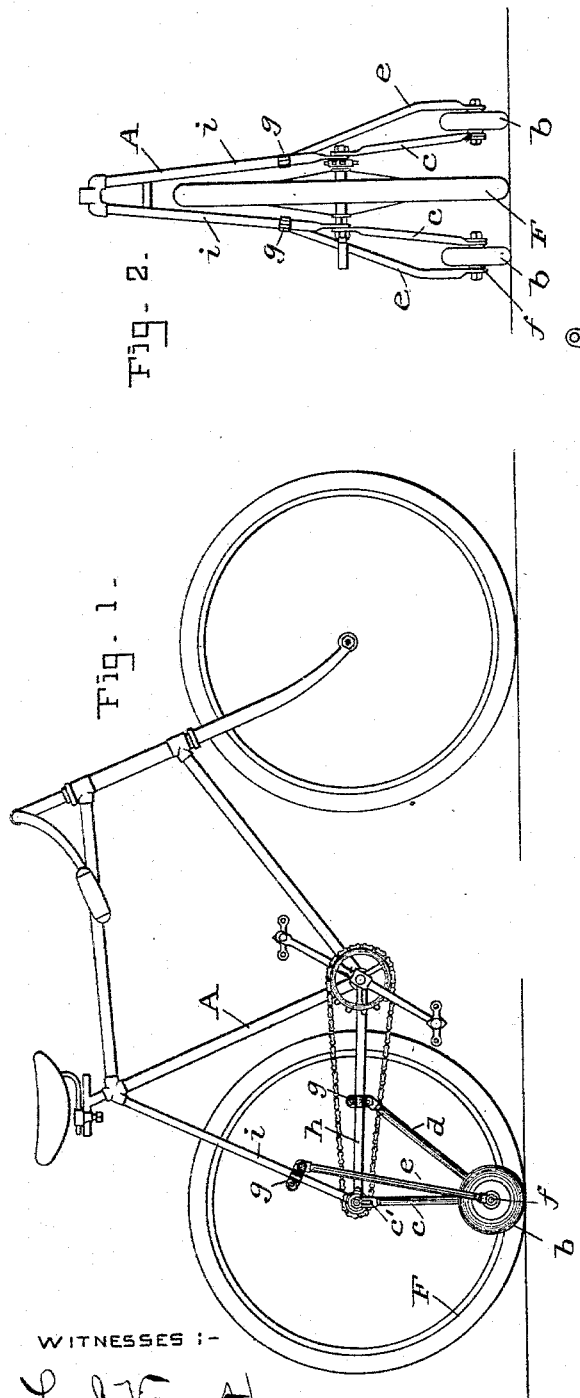
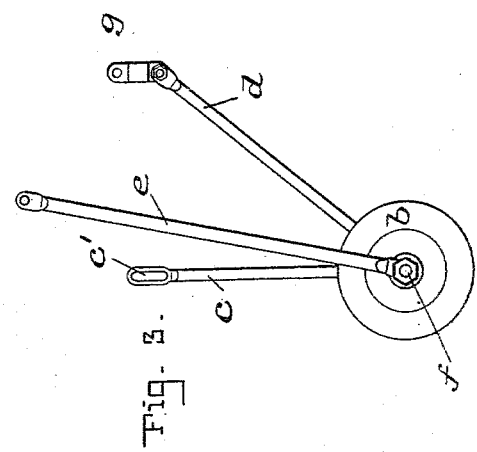
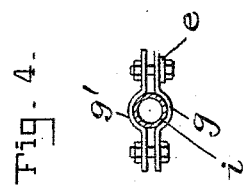
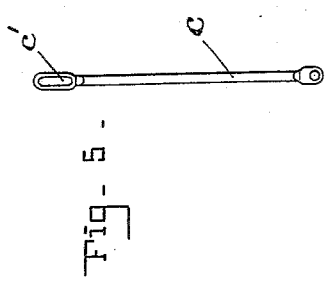
WITNESSES:
L. I. Van Horn.
Charles B. Mann Jr.
INVENTOR:
F. J. Werneth
By Chas B. Mann
ATTORNEY.

UNITED STATES PATENT OFFICE.

FRANCIS J. WERNETH, OF BALTIMORE, MARYLAND.

BICYCLE-SUPPORT.

SPECIFICATION forming part of Letters Patent No. 559,646, dated May 5, 1896.

Application filed August 17, 1895. Serial No. 559,595. (No model.)

*To all whom it may concern:*

Be it known that I, FRANCIS J. WERNETH, a citizen of the United States, residing at Baltimore, in the State of Maryland, have invented certain new and useful Improvements in Bicycle-Supports, of which the following is a specification.

This invention relates to a bicycle-support of improved construction for the use of persons learning to ride.

The invention is illustrated in the accompanying drawings, in which—

Figure 1 is a side view of a bicycle with the improved support attached. Fig. 2 is a rear end elevation showing the support at each side. Fig. 3 is a view of the support detached from the bicycle. Figs. 4 and 5 are views of parts of the device.

The letter A designates an ordinary frame of a bicycle. The support is constructed with a view to its attachment to the side of the bicycle at its rear part. The two supports for the opposite sides of the bicycle are exactly the same, except that they are rights and lefts, and the support for one side is entirely independent or separate from the support for the other side. It will therefore be sufficient to describe the construction of the support for one side only.

The support at each side comprises a small wheel $b$ and three rods $c\ d\ e$, attached to the wheel and projecting upward therefrom. A shaft $f$ passes through the center of the small wheel, and two of the rods $c\ d$ are pivoted at the inward end of the shaft, while the third rod $e$ is pivoted at the outward end of said shaft. In other words, two of the rods $c\ d$ rise upward at the inward side of the small wheel and one rod $e$ at the outward side. These rods are employed as stays or braces, which are attached to the frame A and securely connect the supporting-wheel $b$ to the bicycle. The rods have provision which admit of adjustment at the points where they are attached to the frame, so that the small wheel $b$ may rest on the ground even with the rear wheel F of the bicycle, as seen in Figs. 1 and 2, or said small wheel $b$ may be kept at a slight elevation above the ground when the bicycle is upright and only comes in contact with the ground when the bicycle careens, at which time, by bearing on the ground, the small wheel will check the tendency to careen and prevent upsetting.

The rod $c$ has at its upper end a vertical slot $c'$, which takes over the end of the shaft or bolt on which the rear wheel revolves. A nut on the said shaft or bolt serves to bind this slotted end. It will be seen this slot provides for the vertical adjustment of the wheel $b$. Each of the rods $d\ e$ have at their upper end a clamp $g$ to grip hold of the bars of the bicycle-frame. These clamps are readily loosened and may be reset higher or lower on said bars.

The clamp is clearly shown in Fig. 4 and comprises two twin bars $g\ g'$, each with a half-curve bend at the center and a bolt at each end uniting the twin bars. This clamp on the rod $d$ grips the lower bar $h$ of the bicycle-frame and the clamp on the rod $e$ grips the rear upright bar $i$ of the bicycle-frame.

While the slot $c'$ in the rod $c$ is provided for vertical adjustment the clamp $g$ on each of the other rods $d\ e$ also provides for the same adjustment and enables the small wheel to be mounted rigidly at an elevation above the ground, as already stated. The three rods $c\ d\ e$ coact as braces.

In using these small wheel-supports on a bicycle for a person learning to ride they should at first be secured so as to rest on the ground on the same horizontal plane as the rear wheel F. After a little practice by the learner the small wheels are adjusted at a slight elevation, so as to allow the bicycle to tilt a little, and when the learner has gained some confidence these wheels may be adjusted still higher, thus allowing the bicycle to tilt more, and, finally, when the learner gains sufficient confidence the small supporting-wheels may be removed altogether.

Having thus described my invention, what I claim as new, and desire to secure by Letters Patent, is—

In combination with a bicycle, a device for instructing persons learning to ride, comprising a rod, $c$, provided at its upper end with a vertical slot, $c'$, which engages the shaft end of the rear wheel of the bicycle and is secured thereon by a nut, a second rod, $d$, provided at its upper end with a clamp which engages the lower bar, $h$, of the bicycle-frame, a third rod, $e$, also provided at its upper end with a clamp vertically adjustable on the rear upright bar, $i$, of the bicycle-frame, a shaft, $f$, having its inner end mounted on the lower ends of the said first two rods, $c$, $d$, and its outer end mounted in the lower end of the third rod, $e$, and a small wheel, $b$, mounted on said shaft between the first two rods on the inner side and the third rod on the outer side, substantially as and for the purpose described.

In testimony whereof I affix my signature in the presence of two witnesses.

FRANCIS J. WERNETH.

Witnesses:
 CHARLES B. MANN, Jr.,
 FRANK DE S. BENZINGER.